(12) United States Patent
Butler et al.

(10) Patent No.: US 6,438,717 B1
(45) Date of Patent: Aug. 20, 2002

(54) HIGH SPEED PARALLEL BIT ERROR RATE TESTER

(75) Inventors: Joseph N Butler, Galway; Mark A Hughes, Dublin; Neil O Fanning, Kilworth; Eugene O'Neill; Una Quinlan, both of Dublin, all of (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/436,350

(22) Filed: Nov. 9, 1999

(30) Foreign Application Priority Data

May 26, 1999 (GB) .............................. 9912130

(51) Int. Cl.$^7$ .................... G06F 11/00; G01R 31/28
(52) U.S. Cl. ...................... 714/704; 714/712
(58) Field of Search .................. 714/704, 707, 714/708, 712, 715, 819, 820, 821, 43, 56, 24; 370/351

(56) References Cited

U.S. PATENT DOCUMENTS 4,059,729 A * 11/1977 Eddy et al. ................. 370/249
6,289,039 B1 * 9/2001 Garodnick .................. 375/143

FOREIGN PATENT DOCUMENTS

WO        WO 87/03717        6/1987

* cited by examiner

Primary Examiner—Christine T. Tu
(74) Attorney, Agent, or Firm—Nixon & Vanderhye PC

(57) ABSTRACT

A high speed link between chips and comprising a multiplicity of synchronous serial data channels includes an onboard detector for detecting an error rate for each channel. The transmitter and the receiver chips are configured in response to the detector to select the channel having the lowest error rate as the control channel and optionally to render at least the channel with the highest error rate inactive.

4 Claims, 4 Drawing Sheets

HIGH SPEED PARALLEL BIT ERROR RATE TESTER

FIELD OF THE INVENTION

This invention relates to the testing and control of the transmission of data which is conveyed, particularly from one network device to another over a link of substantial length, in synchronous serial data lines. The invention is particularly although not exclusively intended for use in systems where the data rate is very high, for example of the order of 800 megabits per second or higher.

BACKGROUND TO THE INVENTION

On example of a system to which the present invention is applicable is a system described in the earlier U.S. patent applications Ser. Nos. 09/196,215 and 09/196,216 filed Nov. 20, 1998, which describe a system in which a multiple bit parallel data signal has its individual bytes serialized and transmitted over a respective line of a set of synchronous serial data lines to a receiver at which the original signal is to be reconstituted. Such a system of transmission is suitable for communication between different chips in a network device composed of a multiplicity of chips.

One of the difficulties which arises in the operation of a system of this nature is that streams of data bits obtained by serialising parallel data bytes require proper byte alignment for the reconstitution of the data in its original form. In the aforementioned patent applications there is described a respective system in which the data lines are supplemented by an additional, control, line which may be used for phase alignment and other purposes. The applications describe various different methods, using both comparatively high frequency clocks and low frequency clocks for achieving mutual alignment of the various channels and the conveyance of ancillary or control data over the control line.

A variety of problems arise from the use of an otherwise beneficial system as described above.

In a system which operates at such high frequencies stand alone equipment required to test and obtain bit error rate figures is expensive and available to test only one channel at a time. Thus the true bit error rate must be calculated from an accumulation of data from each channel. Such a calculation is inherently inaccurate because it is not a true parallel test. Furthermore, the practical implementation of such testing is complex owing to the large number of external connections that would be required. Furthermore, known bit error rate testers, such as the Hewlett-Packard E4829B ATM Parallel Cell/Traffic Generator and Analyser or the Tektronix multiBERT MB 100 Bit Error Rate Tester have a maximum frequency of 100 MHz and require that device pins be made available for use as inputs and outputs. These are in addition to the connectors required for connection to the device under test.

Another operational problem with high speed links as described is that the failure of one channel, particularly the control channel, can cause the whole link to go out of service.

In a synchronous link as described, the bit error rate of each channel may be different, depending on, for example, how the printed circuit board tracking carrying the signals is routed. It would be desirable to ensure that the channel carrying control information be routed on the most robust line.

SUMMARY OF THE INVENTION

One aspect of the invention comprises the provision of on board bit error rate testing for a synchronous link, composed of a multiplicity of synchronized serial channels.

Another aspect of the invention is the employment of on board bit error rate testing to determine, for a multiplicity of serial data channels constituting a synchronous parallel bus, the bit error rates for each of the channel to reconfigure the link so that for example the channel which is designated as the control channel is changed to a different channel having a lower measured bit error rate.

In particular, when such a synchronized data link is first initialized, it may enter a mode which generates a bit error rate for each channel within the link. The control line may be assigned to the channel with the lowest bit error rate. If a pre-programmed error count threshold is exceeded during normal operation, the link may be forced into a set up mode wherein the control line is assigned to the channel with the lowest bit error rate and a multiplicity of channels (less than the actual number of channels) are allocated as data channels and the remaining channels with the highest bit error rates are excluded. Although such a scheme reduces the bandwidth of the link, the basic functionality of the link may be maintained.

Such a system increases robustness of the link by ensuring that control information is carried on the channel with a low bit error rate. It results in higher network availability through use of redundancy techniques, enables different configurations of the bus on different platforms and allows testing in the actual normal operational mode.

Other objects and features of the invention will be apparent from the following description of a specific though non-limiting example, with reference to the accompanying drawings.

DETAILED DESCRIPTION OF THE INVENTION

Figure 1:
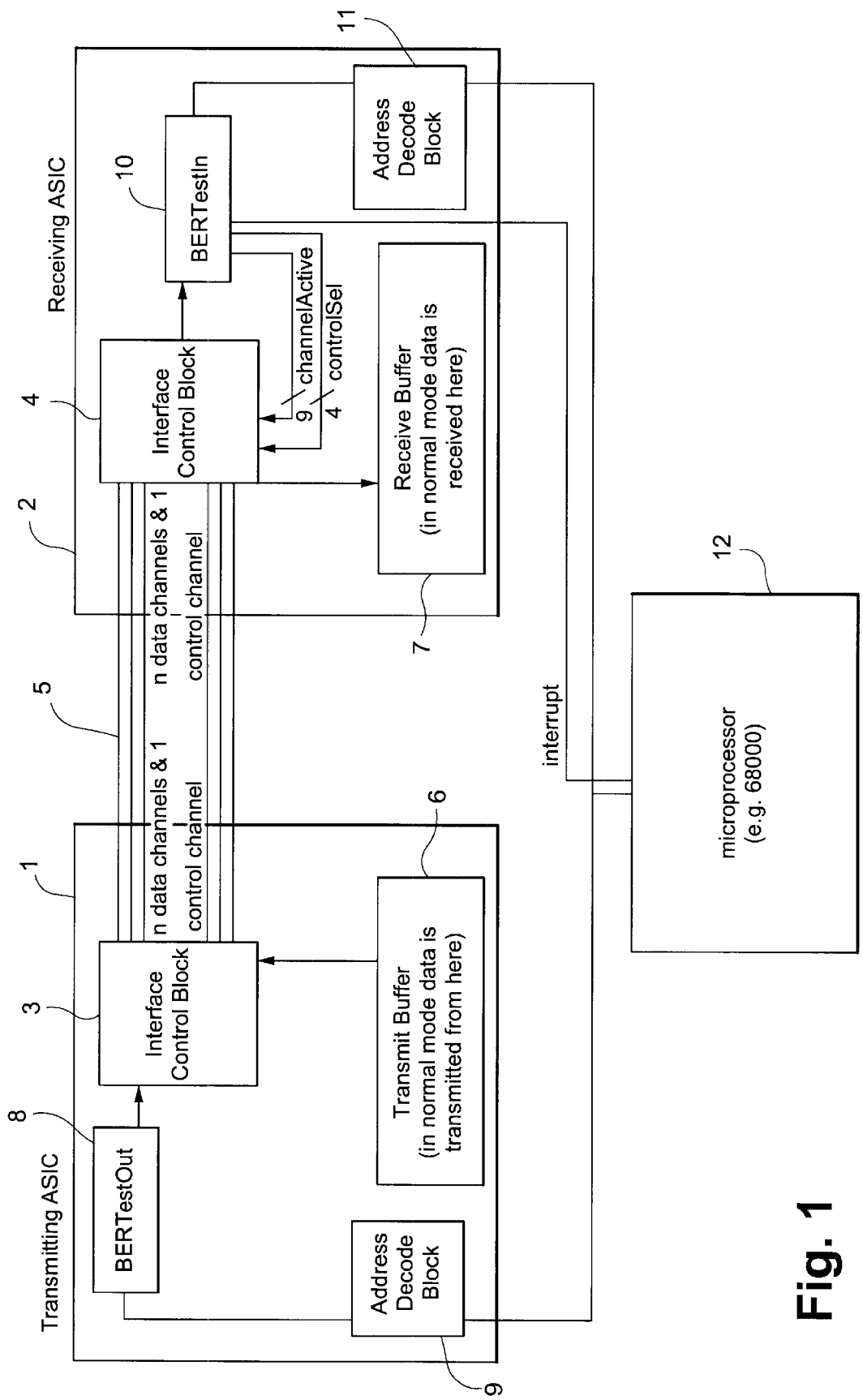
FIG. 1 illustrates schematically a high speed synchronous data link and associated control devices according to the invention.

FIG. 1 illustrates part of a network device including two chips 1 and 2, which comprises a multiplicity of data channels (n) and a control channel. The transmission of data over these channels will not be described in detail since such transmission and the phase alignment of the channels is fully described in either of the aforementioned patent applications. For present purposes, it is sufficient to say that the interface control block 3 receives data, in for example 64-bit wide parallel form, from a transmit buffer 6 and converts each word into a plurality of synchronous bit streams which are transmitted over the data lines of the link 5 to the interface control block 4 which deserializes the data transmitted to reconstitute the data in its original parallel form in a receive buffer 7. More particularly, each group of eight bits may be received by a respective serializer which together with a control bit transmitter are under common clock control by a phase lock loop synthesizer which drives the serializers at a desired frequency, for example of the order of 1 GHz. The serial bit streams are driven onto the lines of the synchronous parallel bus by way of respective differential drivers. The receiver, namely the interface control block 4, is coupled to receive data from the line 5 and includes data recovery blocks each associated with one of the data lines and under common clock control. It is of course customary in data transmission systems to employ cyclic redundancy coding of the transmitted data and this coding may be employed to provide an indication of error rate for each of the channels.

In the receiver, the interface control block 4 is coupled to a bit error rate tester block 10 which, as described later, will for each of the channels including the control channel compare the bit error rates with a threshold and assign a configuration, with the channel having the lowest bit error rate designated as the control channel and a group of channels having the next lowest bit error rates as data channels. The configuration may render channels with the highest bit error rates inactive.

The tester 10 provides control signals determining which are the active channels and which is the control channel to the interface control block. It also communicates the configuration information by way of an address decode block 11 to a microprocessor 12 (after an appropriate interrupt), the microprocessor 12 communicating the configuration information by way of an address decode block 9 on chip 1 to a base error rate control block 8 which configures the interface control block 3 to select the control line and the active data lines in accordance with the configuration of the interface control block 4 by tester 10.

Figure 2:
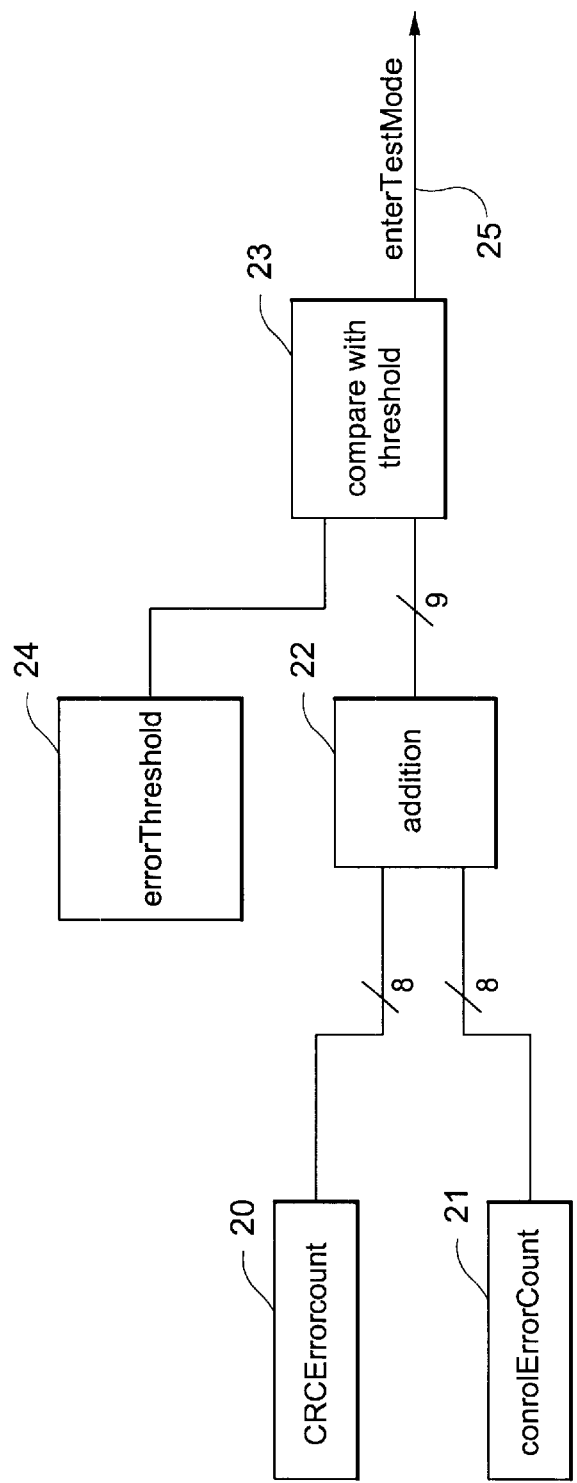
FIG. 2 illustrates process for a tester forming part of the system shown in FIG. 1.

FIG. 2 illustrates counters 20 and 21 counting CRC errors from the data lines and control errors from the control line. These error counts are added at an addition stage 22 and compared with a predetermined error threshold set by difference device 24 in a comparator 23, such that if the combined error rate is above the threshold there is a signal on output line 25 to cause tester 10 to enter a test mode. In this embodiment this combined error rate is employed only to initiate a test which accurately determines the error rates for the channels.

Figure 3:
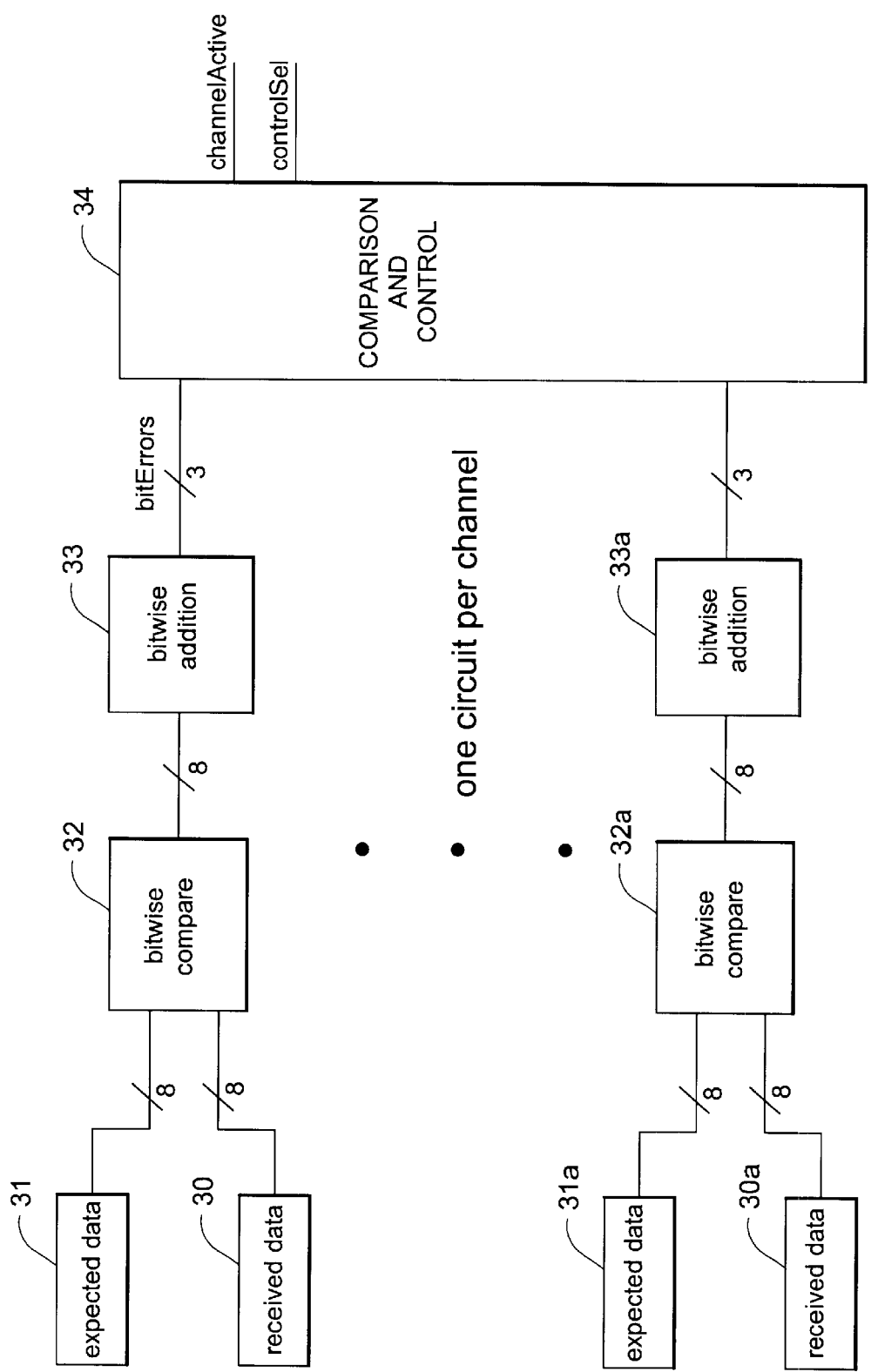
FIG. 3 illustrates the control process for a transmitter in the system FIG. 1.

FIG. 3 illustrates schematically the operation of the tester in a test mode. For each channel, there is a comparison of expected data (block 31) with received data (30) in a bitwise comparator 32. The expected data is identification data such as packet numbers derived from the programming of the transmitter and receiver with the same start values and other data such as the direction of count. The successive outputs of the bitwise comparator 32 are accumulated in a bitwise adder 33 to provide a quantitative measure of bit errors to a comparison and control block 34.

This process is performed for each of the (n+1) channels in the synchronous parallel link. The comparison and control block 34 compares the channel error rates and assigns the configuration as previously described. The stages for another channel are denoted 'a'.

Figure 4:
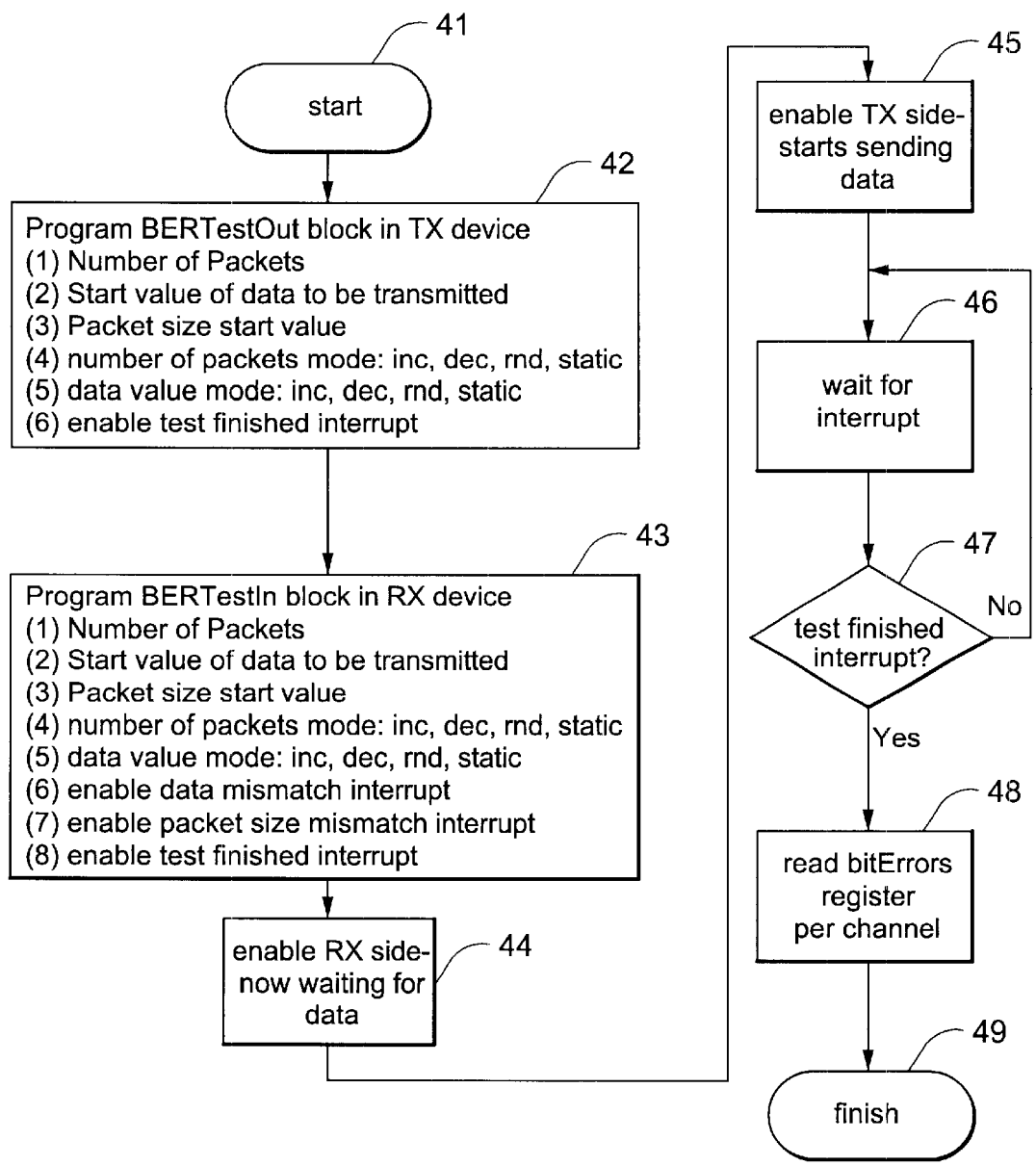
FIG. 4 illustrates a flow diagram for a testing process according to the invention.

FIG. 4 shows the process from the start of operation to the reading of bit errors for each channel. Stage 41 is the start. Stage 42 is the programming of the bit error rate test out block in the transmitting chip 1. It is preferably set with the number of packets, the start value of data to be transmitted, the packet size start value, the number of packets and the mode of transmission, a data value mode and finally provides an enable test finished interrupt. The error rate tester block 10 on chip 2 is programmed with the number of packets, the value of data to be transmitted, the packet size start value, the number of packets mode and the data value mode. The data mismatch interrupt is enabled, the packet size mismatch interrupt is enabled and the enable test finish interrupt is enabled. The receiving side is now enabled (stage 44) and waiting for data. The transmitting side is enabled (stage 45) and starts sending data. There is then a wait for an interrupt. After a determination of whether the test is finished, the bit errors accumulated in a respective register per channel are read.

What is claimed is:

1. A transmission system including a transmitter, a receiver, a multiplicity of synchronous serial data channels coupled between the transmitter and the receiver, the transmitter being capable of selecting one of said channels as a control channel and others of said channels as data channels, the transmitter serializing parallel data at the transmitter and deserializing data from the channels at the receiver, said system further comprising means at the receiver for measuring an error rate for each of the channels and for configuring the transmitter and the receiver to designate a channel having the lowest measured error rate as a control channel.

2. A system according to claim 1 wherein the said means for configuring renders at least a channel with the highest error rate inactive.

3. A transmission system including a transmitter, a receiver, a multiplicity of synchronous serial data channels coupled between the transmitter and the receiver, the transmitter being capable of selecting one of said channels as a control channel and others of said channels as data channels, the transmitter serializing parallel data at the transmitter and deserializing data from the channels at the receiver, said system further comprising means at the receiver for measuring a bit error rate for each of the channels and for configuring the transmitter and the receiver to designate a channel having the lowest measured bit error rate as a control channel, said means for configuring rendering at least the channel with the highest bit error rate inactive; and means for obtaining a combined error rate composed of CRC errors and control errors from the channels and for initiating a measurement of the bit error rates for each of the channels if said combined error rate exceeds a threshold.

4. A transmission system including a transmitter, a receiver, a multiplicity of synchronous serial data channels coupled between the transmitter and the receiver, the transmission system serializing parallel data at the transmitter and deserializing data from the channels at the receiver, said system further comprising means for comparing expected data and received data for each of the channels so as to obtain a measured bit error rate for each of the channels and for configuring the transmitter and the receiver to designate a channel having the lowest measured bit error rate as a control channel.

* * * * *